Patented Apr. 14, 1936

2,037,005

UNITED STATES PATENT OFFICE 2,037,005

FLAKED SULPHUR DYES

William S. Calcott, Pennsgrove, N. J., Herbert A. Lubs, Wilmington, Del., and George Barnhart, Woodbury, N. J., assignors to E. I. du Pont de Nemours & Company, Wilmington, Del., a corporation of Delaware No Drawing. Application May 4, 1932, Serial No. 609,260

1 Claim. (Cl. 8—6)

This invention relates to organic compounds and refers more particularly to readily-soluble sulphur dyes of exceptional stability and strength.

The sulphur or, as they are sometimes called, sulphide dyestuffs are those coloring matters which are prepared by heating aromatic intermediates with sulphur or, more generally, with alkaline polysulphides. This process is called thionation and the immediate product is called the thionation mass. Generally speaking, the thionation is carried out at elevated temperatures in water or alcohol solution. At the end of the reaction the dye is introduced into water and liberated by precipitation and filtration. The dyestuffs of this class known to prior art are amorphous and so difficultly soluble in water that it is usually necessary to incorporate a solubilizing agent before they can be used for dyeing.

It is an object of this invention to produce sulphur dyes which are in the form of flakes, are non-dusting, and dissolve readily in water. A further object is to produce sulphur dyes in the form of vitreous, stable particles of great strength and density. A still further object is to produce sulphur dyes in the form of flakes, grains, platelets or scales which do not contain appreciable amounts of free sulphur. Additional objects will appear hereinafter.

These objects are accomplished by the present invention which, generally stated, involves removing the free sulphur in the dyestuff, suspending the dyestuff in a suitable medium, incorporating a binding agent, and drying the mixture preferably in a layer.

The invention will be more completely understood by a consideration of the following examples:

Example 1

*Sulphur brilliant green.*—The thionation mass obtained by the fusion of the indophenol made from 1 part of phenyl-peri-acid, and para-amidophenol, was diluted with 10 parts of water, and 3 parts of sodium sulphite were added to react with any free sulphur. The solution was then heated to 85° C. and the color precipitated by passing air through the solution. The dyestuff was filtered off, suspended in 0.5 part water, and 0.25 part of 30% sodium sulphide and 0.5 part of black-strap molasses added. The viscous mass was dried on an atmospheric drum dryer. Water-soluble flakes, with a metallic sheen were obtained.

Example 2

*Sulphur navy blue.*—The thionation mass resulting from the fusion of 1 part of an indophenol, made by coupling orthotoluidine with para-amido-phenol, with an aqueous polysulphide containing 1.4 parts of sodium sulphide and 1.4 parts of sulphur, was diluted with 25 parts of water, and 2.5 parts of sodium sulphite were added to react with any free sulphur. It was then heated to 80–85° and the dyestuff precipitated by passing air through the solution. The dyestuff was then filtered off and washed on the filter with water. It was then suspended in 1 part of water and 0.4 part of 30% sodium sulphide and 0.4 part of black-strap molasses added, and the mass stirred to a smooth colloidal suspension. The mass was then dried on an atmospheric drum dryer. Glistening blue-black, water-soluble flakes were obtained.

Example 3

*Sulphur black.*—The mass obtained by the thionation of 1 part of dinitrophenol with an aqueous polysulphide containing 1 part of sodium sulphide and 1.1 parts of sulphur, was diluted with 5 parts of water, 1.5 parts of sodium sulphite were added to react with any free sulphur, the whole heated to 70° C. and the dyestuff precipitated by passing air through the solution. The dye was filtered off and washed on the filter with 4 parts of 10% sodium chloride solution. The washed filter cake was then slurried in 1 part of water, and 0.4 part of 30% sodium sulphide and 0.3 part of preservers' syrup added and the mass stirred to a smooth suspension. It was then dried on an atmospheric drum dryer heated with steam at 30–60 lbs. per square inch pressure. The dried sulphur black was scraped from the revolving drum in the form of black, glistening flakes, which were directly soluble in water.

Example 4

*Sulphur brown.*—One (1) part of meta-tolulylene diamine was fused with 3 parts of sulphur for 20–24 hours at 250–260° C. The resulting thionation mass was extracted with 10 parts of 30% sodium hydroxide for about 1 hour at the boil to remove free sulphur from the dyestuff, then diluted with 10 parts of water and the dyestuff precipitated by passing air through the solution. It was then filtered and the filter cake mixed with 1.5 parts of 30% sodium sulphide and 0.3 part of preservers' syrup, and the mass dried on an atmospheric drum dryer. Glistening, greenish-black, water-soluble flakes were obtained.

The above examples are included merely for purposes of illustration and are not intended to limit, in any way, the applicability of the present invention, since it may be applied to any sulphur dye.

If the full advantages of this invention are to be obtained, the dyestuff should be substantially freed from uncombined sulphur and must contain a binder. Although it is advisable that there should be no free sulphur present in the mass which is to be dried, the presence of very small amounts of free sulphur does not entirely obviate the advantages of the invention. It is advantageous to dry the product in a thin layer, and for this purpose a drum dryer is well suited.

The material used is suspended in a suitable medium. Such a medium may be a binder, water, and sufficient alkali metal sulphide to render the dried product directly soluble in water. The suspension is then dried in layers. The particular method of drying may vary according to the material used and the equipment available. However, very satisfactory results have been obtained by using an ordinary drum dryer.

In the examples black-strap molasses and preservers' syrup have been mentioned as binders, however, any water-soluble, neutral, non-crystalline organic compound may be used for a binder. Some of the compounds used as binders, with excellent results, were cane sugar, corn syrup, cerelose, dextrin, and cellulose glycollate, in addition to the black-strap molasses and preservers' syrup mentioned above.

The present invention produces a product which is characterized by its ready solubility in water; it is vitreous, non-dusting, and extremely stable. The particles produced may be stored for very long periods of time without any noticeable deterioration. The particles are produced in the form of flakes, scales, grains or platelets which may be mechanically handled without breaking or dusting. They do not contain appreciable amounts of free sulphur so may be used for dyeing material without danger of producing sulphur spots or the "bronzy" effect usually noticed on material colored with sulphur dyes.

As many apparently widely different embodiments of this invention may be made without departing from the spirit and scope thereof, it is to be understood that we do not limit ourselves to the specific embodiments thereof except as defined in the appended claim.

We claim:

The method of making a sulphur dyestuff in flake form which includes reacting a thionation mass at elevated temperature with sodium sulphite in water, removing the dyestuff from the solution by precipitation and filtration, mixing the dyestuff with molasses, sodium sulphide, and enough water to make a viscous mass, and drying on a drum dryer.

WILLIAM S. CALCOTT.
HERBERT A. LUBS.
GEORGE BARNHART.